Feb. 12, 1963 G. S. HARBEN, JR., ETAL 3,076,998
POULTRY GIZZARD SPLITTING AND WASHING APPARATUS
Filed May 28, 1959 2 Sheets-Sheet 1
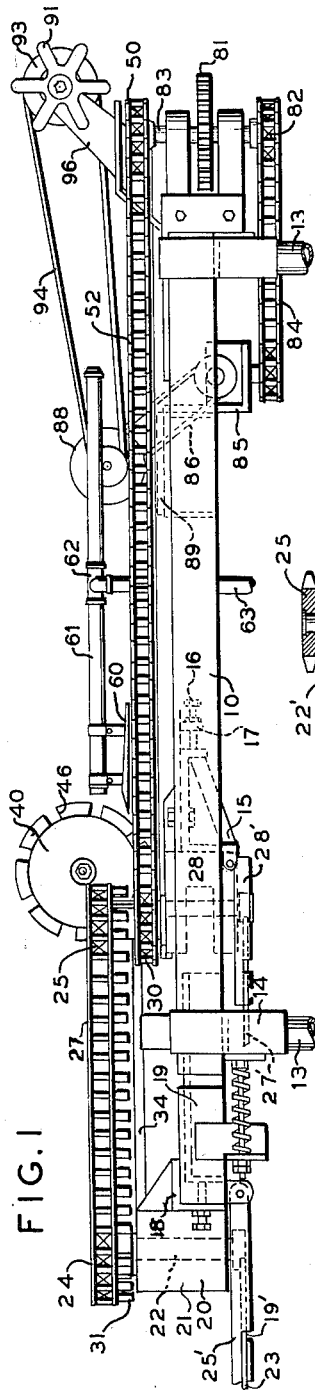
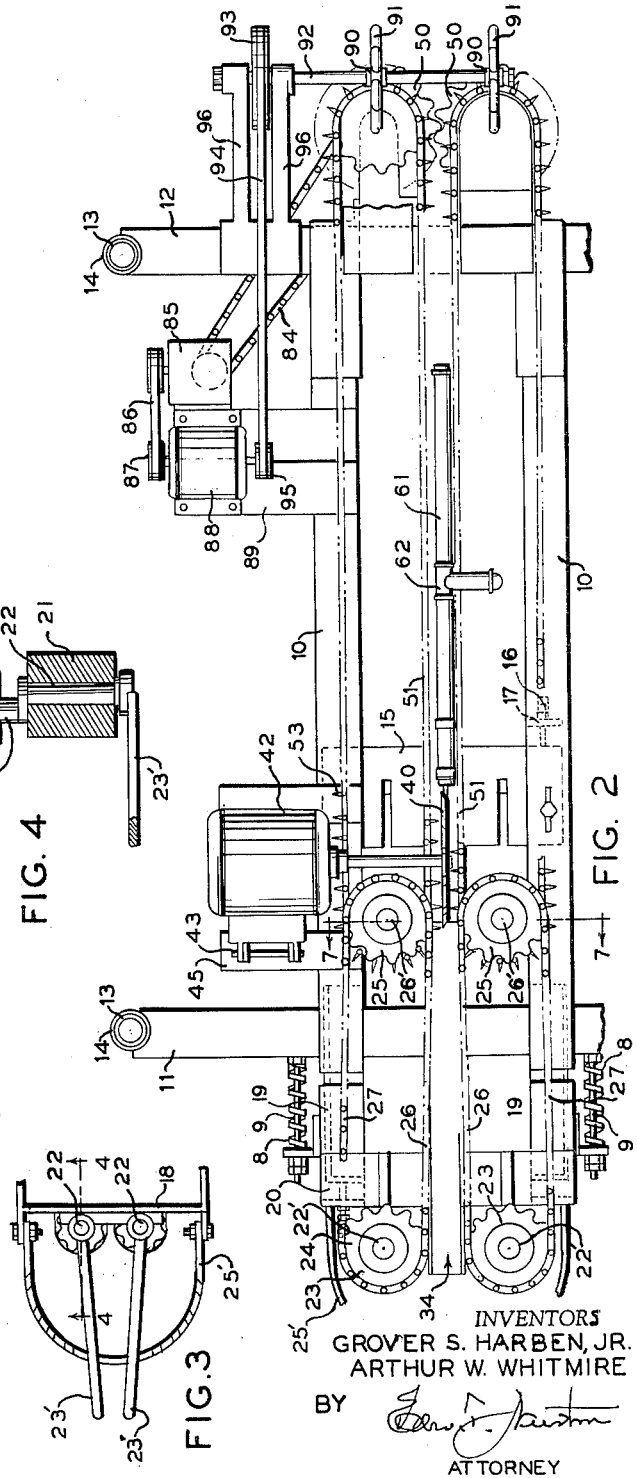
INVENTORS
GROVER S. HARBEN, JR.
ARTHUR W. WHITMIRE
BY
ATTORNEY Feb. 12, 1963  G. S. HARBEN, JR., ETAL  3,076,998
POULTRY GIZZARD SPLITTING AND WASHING APPARATUS
Filed May 28, 1959  2 Sheets-Sheet 2
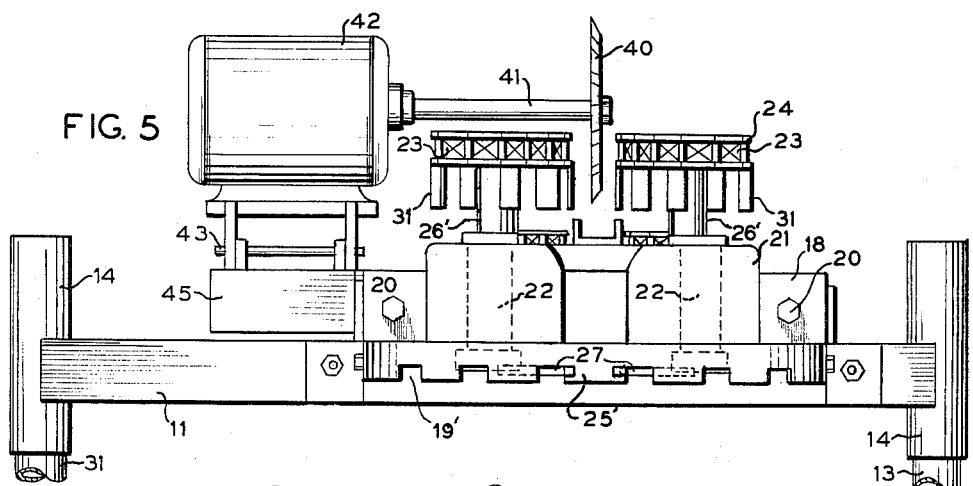
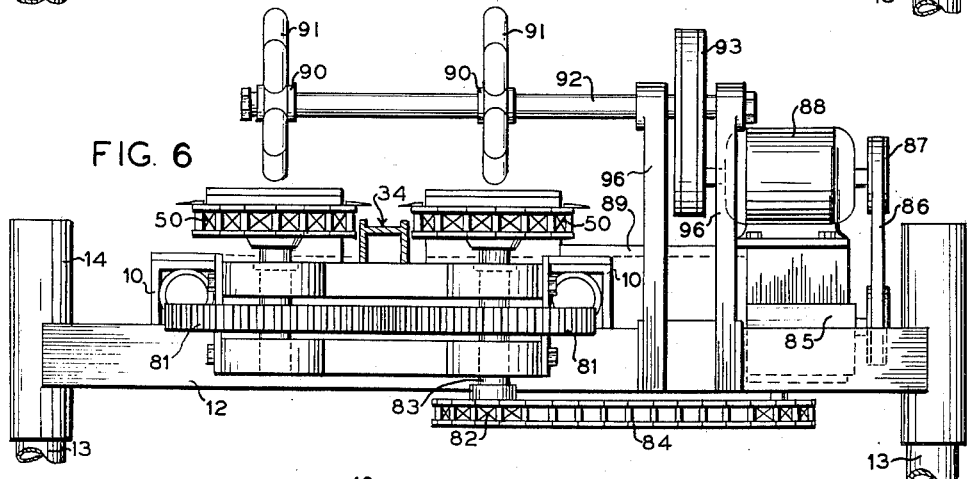
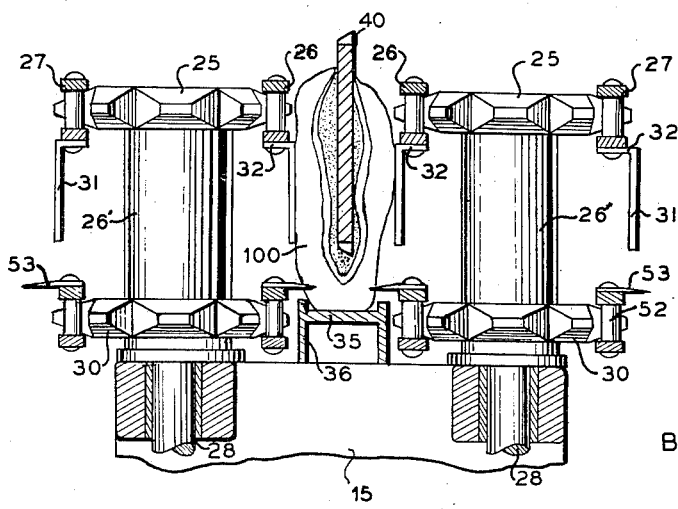
INVENTORS:
GROVER S. HARBEN, JR.
ARTHUR W. WHITMIRE
BY
ATTORNEY

United States Patent Office 3,076,998
Patented Feb. 12, 1963

3,076,998
POULTRY GIZZARD SPLITTING AND
WASHING APPARATUS
Grover S. Harben, Jr. and Arthur W. Whitmire, Gainesville, Ga., assignors to Southern Equipment & Supply Co., Inc., Gainesville, Ga., a corporation of Georgia
Filed May 28, 1959, Ser. No. 816,590
14 Claims. (Cl. 17—11)

This invention relates to poultry gizzard splitting and washing apparatus, and is particularly concerned with continuous and automatically operable equipment for cutting and laying open poultry gizzards, and washing therefrom the accumulated undesirable material so as to prepare the gizzards for human consumption.

The preparation of poultry gizzards for human consumption, in large poultry processing plants, presents substantial problems which have in part been met by the development of continuous equipment for successively cutting open the tough outer membranes of these organs and washing the inner walls thereof as they are passed through the equipment. Such equipment, however, has suffered from the fact that in most instances the gizzards must be impaled to provide adequate retention thereof as it is subjected to the cutting instrumentality. Such impalement not only requires individual manipulation of the gizzards by the operator but rends and tears the gizzards unnecessarily. It is also difficult to detach the gizzard from its impalement when the cutting and washing operations have been completed. Problems have arisen with respect to the placement and securement of the gizzards in an appropriately oriented position for preparing and cutting with respect to the accommodation of successive gizzards of varying size. Other problems have arisen in the matter of the design and construction of a simple, effective apparatus which will faithfully perform the required operations over a long period of use and one well suited to the demands of economic manufacture.

In the present apparatus, the foregoing and other problems have been met by the provision of a preliminary receiving and orienting feed mechanism which receives the gizzard without impalement but which includes means for assuring vertical orientation thereof as it is traversed from a loading station to the incision instrumentality. The mechanism is characterized by the provision of a pair of belts, the flights of which are disposed in a common horizontal plane whereby the flights approach each other at the cutting station and move from each other at the discharge end of the machine so as to automatically fully release the gizzards for discharge. Readily adjustable means are provided to selectively determine the spacing between such flights so as to accommodate the apparatus to gizzards of different size. The incisory instrument is in the form of a vertical knife or saw arranged for rotation on a horizontal axis. This incisory means is so located with respect to the feed mechanism as to produce a vertical cut extending from the top to a point so closely adjacent to the bottom portion thereof as to fully lay bare the internal sack which encases the loose material to be dislodged by the washing operation. One feature of the present invention is the provision of a secondary conveying mechanism which is adapted to seize the uncut base portion of the gizzard at the cutting station and to retain a positive grip thereon through the use of penetrating, but not impaling, pins. The leading ends of the secondary conveyor are also mounted for adjustment of the transverse space between its flights to cooperate with the adjustment of the feed conveyor. This secondary conveyor transports the gizzards from the cutting station through the washing zone for discharge at the opposite end of the apparatus. To insure complete release of the gizzards from pins of the secondary conveyor mechanism, discharge elements with knocker fingers are provided which may impact the gizzards to effect their discharge.

It is therefore among the primary objects of the present invention to provide a novel and improved poultry gizzard splitting and washing machine which is effective and efficient in operation, rugged and durable in construction, and well designed to meet the demands of economic manufacture.

Another object of the present invention is to provide apparatus of the character set forth whereby a poultry gizzard may be received and oriented into a proper position for incision and by which it may be incised while retained in such position and conveyed through the apparatus without the requirement of impalement tending to mutilate the structure of the organ.

It is also an object of the present invention to provide, in an apparatus of the present character, a pair of related and cooperating conveying instrumentalities constructed and arranged to provide for the joint securement and movement of gizzards, by both of such instrumentalities, as they are subjected to the pressure and friction of an incising knife.

In addition, the present invention includes as an object the provision of a device of the character described which is quickly and easily adjustable to accommodate gizzards of different sizes; such means being arranged for convenient manipulation during operation without disturbing the location and function of associated instrumentalities.

A further object of the invention is to provide a novel and improved conveyor mechanism, for a poultry gizzard splitting and washing apparatus, by which the gizzards are secured between opposite flights of a conveyor and are frictionally retained by penetrating pins without requiring impalement of the gizzards and by which they may be conveniently released as the flights of the conveyors diverge from parallel position at the discharge end of the machine.

Numerous other objects, features and advantages of the present invention will be apparent from consideration of the following specification taken in conjunction with the accompanying drawings, in which:

FIG. 1 is a side elevation of one form of the present invention.

FIG. 2 is a top plan view of that form of the invention disclosed in FIG. 1.

FIG. 3 is a detailed bottom plan view showing flight spacing adjustment of the feed conveyor.

FIG. 4 is a detailed vertical section taken on line 4—4 in FIG. 3.

FIG. 5 is an end elevation of the inlet end of the apparatus.

FIG. 6 is a similar end elevation of the discharge end of the apparatus.

FIG. 7 is a detail cross sectional view taken on the line 7—7 of FIG. 2.

Referring to the details of construction of that embodiment of the invention here presented, by way of illustration, in the accompanying drawings, the base structure of the apparatus may be defined as a generally open rectangular frame including the side rails 10, a forward transverse end frame 11 and a parallel transverse end frame 12. This base structure is adapted to be supported in elevated position by vertical standards 13 which are here shown as tubular in form to be received in the tubular sleeves 14 secured in suitable manner, as by welding, to the terminal end of the frames 11 and 12. It will be understood, of course, that the standards 13 may be supported from the floor or a suitable elevated table or framework as desired, and that vertical adjustment thereof for supporting the base in desired horizontal position, at a preferred elevation, may be provided.

As best seen in FIGS. 1 and 2, we have provided an intermediate movable flange or base element 15 slidably supported between rails 10. The longitudinal position of base element 15 may be adjusted by movement of a set screw such as screw 16 projecting through a beam 17 extending from one of rails 10. The purpose of base element 15 will be described hereinafter.

At the forward end of the machine is another base element 18, the position of which is adjustable. Base element 18 is provided with a pair of spaced sleeves 19 which fit over the ends of rails 10 and set screws 20 projecting through base element 18 to abut rails 10 respectively and limit thereby inward movement of base element 18. The base element 18 is resiliently urged outwardly by coil springs 8 acting against frame 11 while rods 9 projecting from end frame 11 through springs 8 and flanges on base element 18 prevent outward movement of the base element 18. The purpose of making the base elements 15 and 18 adjustable with respect to rails 10 is so that the tension on the chains, hereinafter described, may be adjusted.

At the forward end of the machine where the gizzards are to be received for splitting and washing, the base element 18 is provided with spaced, forwardly protruding bearing housings 21 for the reception of vertical sprocket shafts 22. Secured to the upper ends of shafts 22 and offset from the axis thereof are upper sprocket stub shafts 22' forming bearings for the forward pair of conveyor chain sprockets 23. Over these sprockets 23, the links of the forward pair of conveyor feed chains 24 are trained. The lower ends of the bearing shafts 22 are engaged by levers 23' whereby movement of said levers will rotate the shafts 22 to adjust, by eccentric movement, the stub shafts 22' and thus alter the space relationship of the chains 24. Retention of the shafts 22 in angular adjustment is provided by a semi-circular castilated apron 25' into the recesses 19' of which the levers 23 may fit to be held against accidental displacement. The apron 25' projects from the bottom forward edge of base element 18.

Each of the chains 24 is endless in character, opposite return portions being trained about the inward, more closely spaced sprockets 25 to provide confronting pairs of transversely spaced converging flights 26 and outer return diverging flights 27, all disposed in the same plane. Supported by bearing housings 15' of base member 15 are the shafts 28 for supporting and adjusting sprockets 25. Shafts 28 are formed in the manner of shafts 22 with offset stub shafts 26' and levers 27' retained by aprons 28' thus the space relationship of sprockets 25 may be adjusted for compensation with the adjustments of sprockets 23 to alter the conveyor for various sizes of gizzards. Shafts 26' are freely rotatable about the respective axes and sprockets 25 are secured to shafts 26'.

As shown in FIG. 7, sprockets 30 are also secured to shafts 28' below sprockets 25 and the forward return ends of the secondary conveyor chains 52 are trained over sprockets 30. In this manner the forward feed conveyor chains 24 are driven by and with the secondary conveyor chains 52 so that the speed of both conveyors is synchronous and hence the speed of travel of the gizzards through the mechanism is uniform.

Alternate cross pins of the links of the conveyor chains 23, as more clearly shown in FIG. 7, are formed with angle elements having vertically depending plates 31 and horizontal flanges 32 through which such alternate links are secured, the angle elements being in space relation along the flights of the chains. It will, of course, be seen that at the forward end of the machine the return portions of the flights pass inwardly over the sprockets 23 to come into converging spaced relation on a circular arc. Directly below the merging of the chains into these converging flights, there is provided a central longitudinally extending gizzard supporting track 34 having a central horizontal web 35 and vertical supporting side rails 36. The upper surface of the web 35 is located substantially below the plane of the chains 24, and substantially in the plane of the chains 52 hereinafter described. There is thus provided easy means for the reception of the gizzards successively on the web 35 to be oriented to vertical position between the converging plates 31 and thus to be held and carried forward in the apparatus along the track 35 which supports the gizzards and assists the plates 31 in locating them into properly oriented position. It will be understood that the spacing of the opposed conveyor flights is variable, through adjustment of the levers 23' and 27' to provide effective pressure on the sides of the gizzards such as gizzard 100 regardless of size, to force their movement by the plates 31 in the longitudinal direction of the apparatus.

For splitting gizzards by a cut along a plane of maximum area, as the gizzards are carried by the conveyors, a rotary knife or saw blade 40 is mounted in vertical position at the terminal of the flights of the chains 24 and at the origin of the parallel flights of the back chain or secondary conveyor 52 hereinafter described. As best seen in FIG. 5, the blade 40 is mounted on a horizontal arbor 41 of a continuously rotating electric motor 42 pivotally mounted on a pintle 43 supported from a base 45, the pintle 43 being parallel to arbor 41 such that vertical adjustment of the blade with respect to the path of travel of the gizzards may be readily accomplished by rotation of motor 42 about pintle 43. It will, of course, be noted that the blade 40 is located directly in the center of the apparatus between the sprockets 30 and in such position as to engage a gizzard propelled by the conveyor mechanism at the center thereof to produce a vertical central cut extending to the lower portion thereof but not cleaving the gizzard into individual halves, such cut being adequate, however, to expose the entire internal pocket for the cleansing of the gizzard by the water spray. As indicated in FIG. 1, the blade 40 may be serrated by recesses 46 to facilitate the cutting operation. Since the texture of the gizzard walls is tough and resistant and the contents frequently of hard, bony or gravel-like material, the life of a plain-edged knife would be unduly limited.

The secondary conveyor of the present apparatus comprises two parallel conveyor chains 52 arranged in the same plane longitudinally of the apparatus and extending from the sprockets 30 to the discharge end of the machine where they are trained about terminal sprockets 50. Each conveyor chain forms between the inner opposed faces of the pairs of sprockets 30 and 50 parallel confronting flights 51. Suitably selected links 52 of the chains of the secondary conveyor are formed with laterally projecting pins 53 to be disposed in confronting relation at the parallel inner flights. It will be seen that the flights of the secondary conveyor are in a plane below the flights of the first conveyor. The gizzards, having been placed upon the web 35 of the track which is located below the plane of the first mentioned conveyor, adjacent the plane of the secondary conveyor and slightly below the vertical position of the pins 53, are engaged by the pins 53. It will be understood, however, that such engagement is not an impalement of the gizzards. The penetration of the pins 53 is automatically responsive to the converging of the flights 51 as they move toward each other at the sprockets 30 to automatically engage the base portion of each successive gizzard, which portion is below the area engaged by the saw and hence in a portion of the gizzard which is not severed.

As the gizzards pass from the saw after the incision has been performed, they are engaged by an opening blade 60 mounted on the end of water flow pipe 61 in fixed position centrally of the apparatus and at an elevation intermediate that of the plane of the first and second conveyors so that the incision will register with the point of the blade 60. As the gizzards are moved along the device they will be spread open to expose the inner portions thereof to the discharge of water from the orifices of the water flow pipe 61 mounted by a T connection 62 from a vertical water supply pipe 63. It will, of course, be noted that the pipe 61 extends longitudinally centrally of the apparatus in a position directly over the line of movement of the split gizzards as they emerge from the rotary saw 40 and as they are spread by the blade 60. The gizzards are thus retained in their travel by the pins 53 and move centrally of the machine to the rear discharge portion where the flights 51 diverge as they pass around the sprockets 50. It will be noted that the sprockets 50 are carried on the upper ends of spindles 83 and are driven through the medium of a drive sprocket 82 mounted on the lower end of the righthand of spindle 83, as indicated in FIG. 6. Meshing cog wheels 81 on spindles 83 transfer power from the righthand spindle 83 to the lefthand spindle 83. A chain drive 84 couples the sprocket 82 to a speed reduction drive 85 powered by a belt 86 from the pulley 87 of the motor 88. The motor 88 and the speed reduction drive 85 are supported by a plate 89 extending from one of the side rails 10.

In some instances the pins 53 may so engage the gizzards as to preclude free discharge thereof when the chains 52 separate, and in order to forcibly dislodge the gizzards from such chains there is provided a pair of spaced dislodging wheels 90, each of which includes radially extending knocker fingers 91, the wheels being mounted on a transverse shaft 92 driven by a pulley 93 by a belt 94 from pulley 95 of the motor 88, and hence the wheels will be continuously rotating. The shaft 92 is journalled for rotation by upwardly and rearwardly extending brackets 96 supported on end frame 12. It will be noted that the wheels 90 are located on an axis directly over the maximum outer position of the chains as they pass around the sprockets 50, and are thus in position to engage and insure discharge of the gizzards by longitudinal impulse directed thereto should such gizzards adhere to either of the secondary conveyor chains.

From the foregoing, it will be seen that the present invention provides a novel, simple, effective and efficient means for conveying poultry gizzards from a loading zone at the left-hand end of the machine as shown in FIGS. 1 and 2, past the cutting zone where the saw 40 is located and under the cleaning spray from pipe 61 to a terminal discharge position where the knocker fingers 91 insure the release of the gizzards for downward vertical fall into such receptacles as may be positioned for their reception. It will be understood that in the practice of the invention the structural details herein presented are disclosed by way of illustration and the invention is not limited or confined to such details. Numerous changes, modifications and the full use of equivalents may be resorted to in the practice of the invention without departing from the spirit or scope thereof as defined in the appended claims.

We claim:

1. Poultry gizzard treatment apparatus including a frame structure, a pair of horizontal chains cooperating to form a feed conveyor for feeding gizzards longitudinally of the apparatus, guide means associated with said horizontal chains for positioning said gizzards with respect to said horizontal chains, and a secondary conveyor including a horizontal pair of parallel chains disposed in a plane below said first mentioned pair of chains and cooperating therewith to receive gizzards from said first pair of chains to continue the movement of the gizzards longitudinally of the apparatus and a knife vertically disposed in a plane between said chain of said secondary conveyor and projecting below the upper plane of said first mentioned horizontal chains for partially severing each of said gizzards as it is conveyed therepast, the lower edge of said blade being positioned above the plane of said guide means by a distance less than the vertical height of said gizzards when carried on said horizontal conveyor.

2. Poultry gizzard treatment apparatus including a frame structure, a pair of horizontal chains cooperating to form a feed conveyor for feeding gizzards longitudinally of the apparatus, guide means associated with said horizontal chains for positioning said gizzards with respect to said horizontal chains, and a secondary conveyor including a horizontal pair of parallel chains disposed in a plane below said first mentioned pair of chains and cooperating therewith to receive gizzards from said first pair of chains to continue the movement of the gizzards longitudinally of the apparatus, means for laterally adjusting one of said pair of chains to accommodate gizzards of varying size and a vertically disposed knife in the path of feeding of said gizzards for partially but not completely severing each gizzard as it passes thereby, the lower edge of said blade being positioned above the plane of said guide means by a distance less than the vertical height of said gizzards when carried on said horizontal conveyor.

3. Poultry gizzard treatment apparatus including a frame structure, a pair of horizontal chains cooperating to form a feed conveyor for feeding gizzards longitudinally of the apparatus, and a secondary conveyor including a horizontal pair of parallel chains disposed in a plane below said first mentioned pair of chains and cooperating therewith to receive gizzards from said first pair of chains to continue the movement of the gizzards longitudinally of the apparatus, said first pair of chains being provided with opposed upstanding plates spaced apart along the inner flights for engaging the opposite sides of gizzards to constitute gizzard holding elements, said second pair of chains including laterally extending gizzard piercing pins.

4. Poultry gizzard treatment apparatus including a frame structure, a first pair of horizontal chains cooperating to form a feed conveyor for feeding gizzards longitudinally of the apparatus, a secondary conveyor including a horizontal second pair of parallel chains disposed in a plane below said first pair of chains and cooperating therewith to receive gizzards from said first pair of chains to continue the movement of the gizzards longitudinally of the apparatus, said first pair of chains being provided with downwardly extending plates constituting gizzard holding elements, said second pair of chains including laterally extending gizzard piercing pins, a saw mounted on said frame structure for splitting the gizzards carried by the chains, and means cooperating with said second pair of chains for washing the split gizzards carried by said second pair of chains.

5. The combination with a poultry gizzard splitting saw, of a conveyor having horizontal flights located on opposite sides of said saw and in one plane for conveying gizzards toward said saw and a cooperating secondary conveyor having horizontal flights in a plane spaced from the plane of the first mentioned conveyor for conveying gizzards from said saw, said flights being vertically overlapping at the cutting area of said saw to jointly retain the gizzards during the splitting operation, each conveyor being characterized by an individual type of gizzard retaining construction, the first conveyor having plates for retaining the gizzards in vertical oriented position while the secondary conveyor includes lateral pins for engaging the bases of the gizzards.

6. Poultry gizzard splitting apparatus including a horizontal frame, pairs of horizontal sprockets, motor means for rotating said sprockets, two pairs of horizontal conveyor chains trained over said sprockets for conveying gizzards thereon the length of said frame, guide means below said horizontal chains for positioning said gizzards at a predetermined height when carried by said horizontal chains, and a gizzard cutter disposed between the inner flights of said conveyor chains located at the area of said vertically spaced sprockets for cutting the gizzards carried by the conveyor chains, one of said pairs of sprockets being in vertically spaced alignment with the other pair of said sprockets and means for simultaneously moving said sprockets toward and away from said gizzard cutter for accommodating various size gizzards.

7. In a gizzard splitting apparatus of the type having a frame and a knife carried by the frame for severing successive gizzards fed thereto, the combination therewith of a pair of opposed first conveyors on said frame for engaging successive gizzards by their opposite sides along their central portions and for conveying the same successively along a linear path toward said knife and for releasing the same adjacent thereto, track means below said conveyor for supporting said gizzards carried by said first conveyor, and secondary conveyor means for seizing and positively gripping the base portions of said gizzards immediately prior to their release by said first conveyor and for carrying said gizzards in the same linear path and in upright positions across said blade whereby the gizzards are respectively successively provided with vertical cuts joined only by the uncut base portion.

8. In a gizzard splitting apparatus of the type having a frame in a longitudinal vertical plane and a knife carried by the frame for severing successive gizzards fed thereto, the combination therewith of a pair of opposed first conveyors on said frame spaced by equal distances on opposite sides of the plane of said knife for engaging successive gizzards by their opposite sides along their central portions and for conveying the same successively along a linear path toward said knife and for releasing the same adjacent thereto, guide means below said horizontal chains for positioning said gizzards at a predetermined height when carried by said horizontal chains, and secondary conveyor means below said first conveyors for seizing and positively gripping the base portions of said gizzards immediately prior to their release by said first conveyor and for carrying said gizzards in the same linear path and in upright positions across said blade whereby the gizzards are respectively successively provided with vertical cuts joined only by the uncut base portion.

9. In a gizzard splitting and washing apparatus of the type having a frame in a longitudinal vertical plane and a knife carried by the frame for severing successive gizzards fed thereto, the combination therewith of a pair of opposed first conveyors on said frame spaced by equal distances on opposite sides of the plane of said knife for engaging successive gizzards by their opposite sides along their central portions and for conveying the same successively along a linear path toward said knife and for releasing the same adjacent thereto, guide means below said horizontal chains for positioning said gizzards at a predetermined height when carried by said horizontal chains, secondary conveyor means below said first conveyors for seizing and positively gripping the base portions of said gizzards immediately prior to their release by said first conveyor and for carrying said gizzards in the same linear path and in upright positions across said blade whereby the gizzards are respectively successively provided with vertical cuts joined only by the uncut base portion, means for opening said gizzards along their vertical cuts as said gizzards are gripped by said secondary conveyor, and means for spraying water into each opened gizzard for removing the loose material therefrom.

10. In a gizzard splitting apparatus of the type having a frame and a knife carried by the frame for severing successive gizzards fed thereto, the combination therewith of a pair of opposed first conveyors on said frame for engaging successive gizzards by their opposite sides along their central portions and for conveying the same successively along a linear path toward said knife and for releasing the same adjacent thereto, guide means below said horizontal chains for positioning said gizzards at a predetermined height when carried by said horizontal chains, secondary conveyor means below said first conveyors for seizing and positively gripping the base portions of said gizzards immediately prior to their release by said first conveyor and for carrying said gizzards in the same linear path and in upright positions across said blade whereby the gizzards are respectively successively provided with vertical cuts joined only by the uncut base portion, means for opening said gizzards along their vertical cuts as said gizzards are gripped by said secondary conveyor and means for simultaneously moving by an equal amount the opposed conveyors toward and away from each other to accommodate various size gizzards.

11. In a gizzard splitting apparatus, a frame, first and second parallel pairs of opposed sprockets, shafts carrying said sprockets, first chains carried by said sprockets, the inner flights of said opposed chains being spaced from each other, opposed plates carried by said chains and normally spaced apart along the inner flight of said chains by approximately the thickness of a gizzard whereby the opposed sides of gizzards fed to said chains will be engaged by said plates, a track below and substantially parallel to the plane of said chains, third sprockets below said second sprockets, fourth opposed sprockets spaced from and in the same plane with said third sprockets, second chains carried by said third and fourth sprockets, opposed pins carried by said second chains and projecting inwardly along the inner flights of said chains, the inner ends of said sprockets on opposite chains terminating in spaced relationship to each other, said second chains and said track being aligned whereby said pins will engage the lower portions of the gizzards as they are fed from said chains, a vertically disposed knife positioned midway between said second chains adjacent said second and third pairs of sprockets for partially severing each gizzard, means for synchronically rotating certain of said sprockets to drive the opposed chains in opposite directions.

12. In a gizzard splitting apparatus, a frame, first and second parallel pairs of opposed sprockets, shafts carrying said sprockets, eccentric rotatable mountings carrying said shafts and mounted on said frame whereby rotation of said mountings will alter the position of said sprockets, means for locking said mountings in preselected positions, opposed first chains carried by said sprockets, the inner flights of said opposed chains being spaced from each other, opposed plates carried by said chains and normally spaced apart along the inner flight of said chains by approximately the thickness of a gizzard whereby the opposed sides of gizzards fed to said chains will be engaged by said plates, a track below and substantially parallel to the plane of said chains, third sprockets concentric with and below said second sprockets, fourth opposed sprockets spaced from and in the same plane with said third sprockets, second chains carried by said third and fourth sprockets, opposed pins carried by said second chains and projecting inwardly along the inner flights of said chains, said second chains and said track being aligned whereby said pins will engage the lower portions of the gizzards as they are fed from said first chains, a knife positioned between said second chains adjacent said secord and third pairs of sprockets for partially severing each gizzard, and means for synchronically rotating certain of said sprockets to drive the opposed chains in opposite directions.

13. A gizzard splitting and washing apparatus comprising a frame, first and second parallel pairs of opposed sprockets, shafts carrying said sprockets, eccentric rotatable mountings carrying said shafts and mounted on said frame whereby rotation of said mountings will alter the position of said sprockets, means for locking said mounting in preselected positions, opposed first chains carried by said sprockets, the inner flights of said opposed chains being spaced from each other, opposed plates carried by said chains and normally spaced apart along the inner flight of said chains by approximately the thickness of a gizzard whereby the opposed sides of gizzards fed to said chains will be engaged by said plates, a track below and substantially parallel to the plane of said chains, third sprockets concentric with and below said second sprockets, fourth opposed sprockets spaced from and in the same plane with said third sprockets, second chains carried by said third and fourth sprockets, opposed pins carried by said second chains and projecting inwardly along the inner flights of said chains, said second chains and said track being aligned whereby said pins will engage the lower portions of the gizzards as they are fed from said first chains, a knife positioned midway between said second chains adjacent said second and third pairs of sprockets for partially severing each gizzard, means for synchronically rotating certain of said sprockets to drive the opposed chains in opposite directions, opening means behind said blade for opening the severed gizzard, and washing means behind said opening means for spraying water onto the opened gizzard as the same is carried by said pins.

14. A gizzard splitting and washing apparatus comprising a frame, first and second parallel pairs of opposed sprockets, shafts carrying said sprockets, eccentric rotatable mountings carrying said shafts and mounted on said frame whereby rotation of said mountings will alter the position of said sprockets, means for locking said mounting in preselected positions, opposed first chains carried by said sprockets, the inner flights of said opposed chains being spaced from each other, opposed plates carried by said chains and normally spaced apart along the inner flight of said chains by approximately the thickness of a gizzard whereby the opposed sides of gizzards fed to said chains will be engaged by said plates, a track below and substantially parallel to the plane of said chains on which the bottommost portion of said gizzards ride when conveyed by said chains, third sprockets concentric with and below said second sprockets, fourth opposed sprockets spaced from and in the same plane with said third sprockets, second chains carried by said third and fourth sprockets, opposed pins carried by said second chains and projecting inwardly along the inner flights of said chains, said second chains and said track being aligned whereby said pins will engage the lower portions of the gizzards as they are fed from said first chains, a knife positioned midway between said second chains adjacent said second and third pairs of sprockets for partially severing each gizzard, means for synchronically rotating certain of said sprockets to drive the aforesaid chains in opposite directions, opening means behind said blade for opening the severed gizzard, washing means behind said opening means for spraying water onto the opened gizzard as the same is carried by said pins, and means at the end of said second chains for dislodging said gizzards from said pins.

References Cited in the file of this patent

UNITED STATES PATENTS

| | | |
|---|---|---|
| 1,095,802 | Browning | May 5, 1914 |
| 1,124,406 | Feuerstein | Jan. 12, 1915 |
| 2,569,839 | Watson | Oct. 2, 1951 |
| 2,673,640 | Temple | Mar. 30, 1954 |
| 2,682,331 | Campbell | June 29, 1954 |
| 2,695,418 | Patterson et al. | Nov. 30, 1954 |
| 2,739,345 | Kirstmann | Mar. 27, 1956 |
| 2,766,870 | Baker et al. | Oct. 16, 1956 |
| 2,787,362 | Hill | Apr. 2, 1957 |
| 2,924,844 | Hill | Feb. 16, 1960 |